US005746198A

United States Patent [19]
Taba et al.

[11] Patent Number: 5,746,198
[45] Date of Patent: May 5, 1998

[54] VALVE FOR A FIRST STAGE REGULATOR HAVING AN ENCAPSULATED HEAD

[75] Inventors: Serge Taba, Mission Viejo; Michael V. Morgan, Laguna Beach, both of Calif.

[73] Assignee: U.S. Divers Co., Inc., Santa Ana, Calif.

[21] Appl. No.: 816,086

[22] Filed: Mar. 13, 1997

[51] Int. Cl.⁶ .............. A62B 9/02; A62B 18/02; F16L 7/00; F16K 31/12
[52] U.S. Cl. .............. 128/204.26; 128/205.24; 137/505.42; 137/375; 251/357; 251/358
[58] Field of Search .......... 128/204.26, 205.24, 128/201.28, 204.18; 137/375, 505.42, 505.18; 251/356–358, 368

[56] References Cited

U.S. PATENT DOCUMENTS

| | | |
|---|---|---|
| 618,878 | 2/1899 | Hills . |
| 3,318,567 | 5/1967 | Gifford .............. 128/205.24 |
| 3,495,607 | 2/1970 | Shugarman .............. 128/205.24 |
| 3,527,404 | 9/1970 | Fieni .............. 137/505.42 |
| 3,537,683 | 11/1970 | Snell, Jr. .............. 128/205.24 |
| 3,552,426 | 1/1971 | Hester et al. .............. 137/375 |
| 3,738,383 | 6/1973 | David .............. 128/205.24 |
| 3,904,173 | 9/1975 | Taylor .............. 128/205.24 |
| 3,958,595 | 5/1976 | Al et al. .............. 128/205.24 |
| 3,990,675 | 11/1976 | Bonafous .............. 128/205.24 |
| 4,237,917 | 12/1980 | Merrifield .............. 128/205.24 |
| 5,139,046 | 8/1992 | Galli . |
| 5,392,825 | 2/1995 | Mims et al. .............. 137/505.42 |
| 5,413,096 | 5/1995 | Hart . |
| 5,497,803 | 3/1996 | Ferrante .............. 137/505.42 |

FOREIGN PATENT DOCUMENTS

| | | |
|---|---|---|
| 1200315 | 12/1989 | Italy . |
| 01241861 | 1/1994 | Italy . |
| 01242236 | 3/1994 | Italy . |
| 1039202 | 8/1966 | United Kingdom . |
| 1308648 | 2/1973 | United Kingdom . |

Primary Examiner—Kimberly L. Asher
Attorney, Agent, or Firm—George F. Bethel; Patience K. Bethel

[57] ABSTRACT

A movable valve member is disposed within a first stage regulator within a regulator body for receipt of pressurized gas. The movable valve member is formed of a metal having an enlarged head and an attached stem with a shoulder integral with the stem adjacent the enlarged head. Surrounding the head and extending peripherally is an elastomeric or plastic material. A support washer is pressed over the shoulder against the plastic molded surface and is frictionally engaged to support the elastomeric or plastic material. A process for making the movable valve member is also provided.

16 Claims, 2 Drawing Sheets

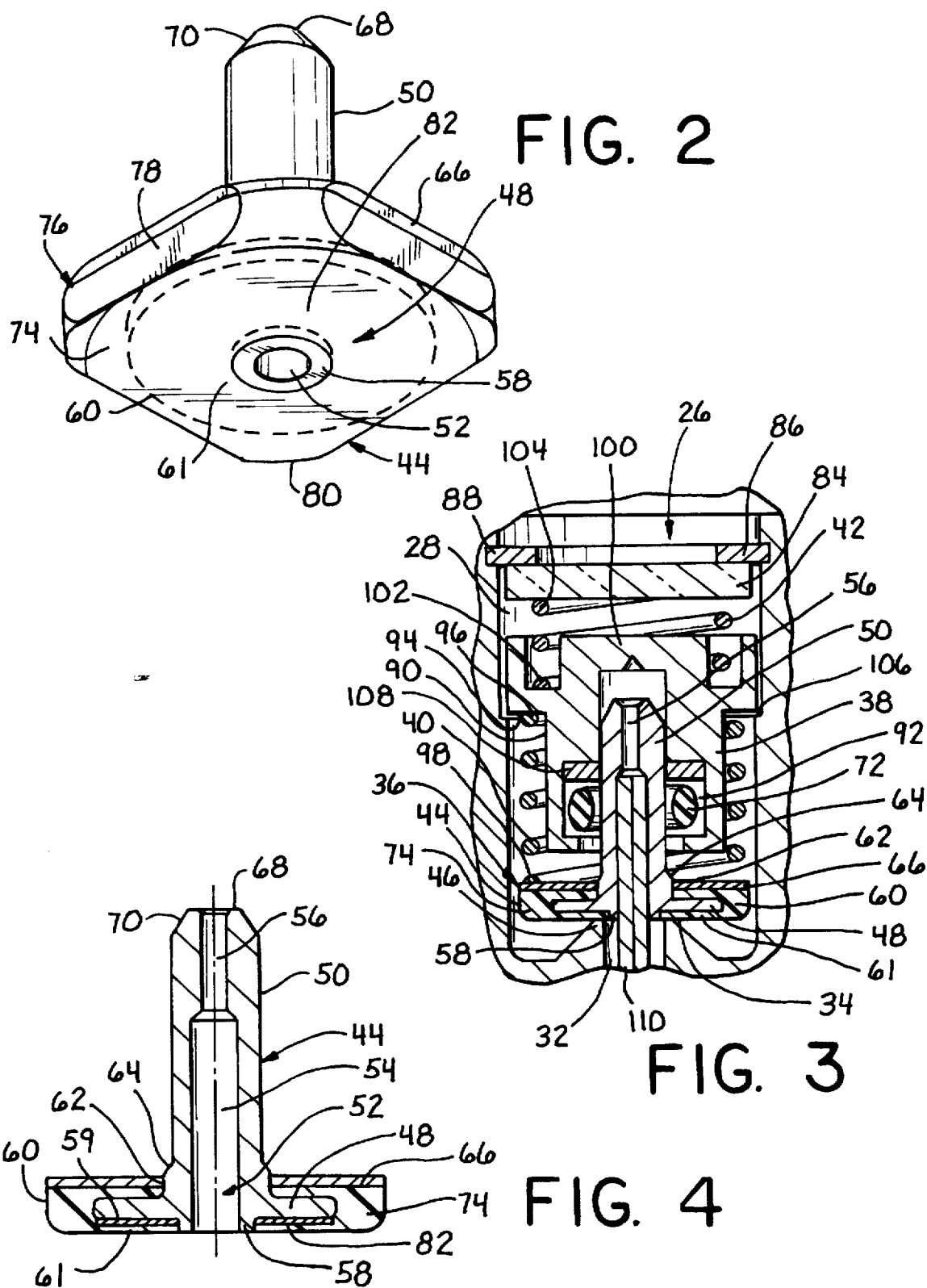

VALVE FOR A FIRST STAGE REGULATOR HAVING AN ENCAPSULATED HEAD

FIELD OF THE INVENTION

This invention relates to a movable valve member for a first stage regulator for a self-contained underwater breathing apparatus or for an emergency air source for industrial or firemen's safety in hazardous or contaminated air conditions. The movable valve member is used to regulate high pressure breathing gas or other gas from a high pressure to an intermediate pressure for demand usage.

BACKGROUND OF THE INVENTION

Breathing gas is highly pressurized and needs to be regulated from about 3,000 to 4,500 psi down to about 120 to 140 psi. Such regulators are known in self-contained underwater breathing apparatus as well as in self-contained emergency breathing apparatus. Typically, gas pressure is reduced through two stages: a first stage or high pressure regulator and a second stage commonly referred to as a demand regulator.

Inhalation from a demand regulator causes movement of a diaphragm which operates a valve linked to it. Upon the demand regulator valve opening, the first stage or high pressure regulator then regulates gas flow from the source, such as a high pressure tank or cylinder. Often, the high pressure regulator is attached to a valve of a tank by means of a yoke having a yoke screw connected to a threaded shaft. Opening the valve allows the high pressure source of gas to flow into the first stage regulator and after regulation to the second stage intermediate, or demand regulator.

The first stage or high pressure regulator includes a movable valve member which moves axially within a high pressure chamber within the valve body. The movable valve member has an enlarged head connected to a stem. An axial through opening or bore extends from the head through to the stem end and acts as a pressure balance. The head of the movable valve member is provided with a soft rubber-like or deformable material for seating against a high pressure orifice, nozzle or crown which separates the high pressure chamber from a low pressure chamber.

An early valve member shown in U.S. Pat. No. 618,878, is formed of a semi-elastic or rubber material which can contain a straight or T-shaped strengthening member to prevent fracture. To prevent spreading of the semi-elastic or rubber material, the valve member is provided with an exterior thin metal reinforcing member which can surround the stem and a portion of the head leaving the seating surface free. Alternately, the reinforcing member can surround the underside and sides of the head leaving the seating surface free.

This valve member does not contain a through hole or axial bore for pressure balancing and stem guiding. It is forced into a recess in the carrier. It appears to be designed for use with liquids or low pressure fluids. Since the valve member is not reinforced across the seating area, if exposed to high pressure, it would, in all likelihood, be extruded though the crown or orifice, or be dislodged from the carrier. Thus, this valve member is not suitable for use with the high pressures associated with self-contained breathing apparatus.

A more recent movable valve member shown in U.S. Pat. No. 5,413,096, is formed of a metal body having an enlarged head attached to a stem. An axial bore or through hole surrounded by a raised metal collar on the head extends axially through the head and stem. A plastic or elastomeric material surrounds the collar and covers the head to extend peripherally from the head. The plastic material also covers the stem except for the opening to the axial bore in the stem.

Another improved valve member shown in U.S. Pat. No. 5,139,046 has a raised annular collar surrounding the axial bore within the head with an adjacent annular groove. An integrally formed shoulder surrounds the lower stem end. A resilient synthetic plastic material is molded over the enlarged head and covers most of the stem leaving the axial bore and the shoulder adjacent the stem end free of plastic material. A metallic guide collar having a recessed seat cups and receives the head and molded plastic material leaving the contact or sealing surface of the head free. The guide collar contacts and slides within the cylindrical surfaces of the valve body.

These valve members represent an improvement over the prior art designs, but the presence of a plastic material over the stem can lead to binding or locking up problems when the valve member is moving axially during high pressure gas regulation.

Also, during seating against the orifice, nozzle or crown, the elastomer or plastic rubber-like material can become contaminated with small impurities contained within the pressurized gas. If the elastomer or plastic material is not sufficiently soft, the valve begins to deteriorate. The result can be that the valve will supply excess gas or less gas than demanded by a user. At the same time, a harder plastic material is best for resisting wear and delamination or peeling away of the plastic material from the metal material of the head and stem when exposed to high pressures.

Also, keeping the through hole or axial bore free of rubber material during manufacture is difficult so that the axial bore is often drilled in a final step leading to increased manufacturing costs.

As a consequence, it is an object of the invention to provide an improved movable valve member having a plastic material which is mechanically retained and chemically bonded to the metal valve member so that improved delamination resistance is provided over prior art designs.

It is a further object of the invention to provide a reinforcing washer which frictionally engages a shoulder on the stem to support the plastic material covering the head of the valve member to prevent spreading during seating and to support a biasing spring to prevent wear of the plastic material.

It is another object of the invention to provide a movable valve member having a head and stem made of an oxidation and corrosion resistant metal composition which supports the plastic material covering the head and which exhibits low friction against the O-ring seal against which it moves.

It is another object of the invention to provide a movable valve member having an adhesive disposed between and chemically bonded to the surface of the movable valve head and to the molded plastic or elastomeric material to resist delamination during exposure to high pressure gas.

It is another object of the invention to provide a method for manufacture of a movable valve member.

SUMMARY OF THE INVENTION

This invention provides a unique axially movable high pressure valve member for a first stage regulator. The valve member has a metal body comprising an enlarged head connected to a stem. A through hole or axial bore which extends axially from the head through the stem is surrounded on the head by a raised collar. At the juncture between the head and the stem is a shoulder which surrounds the stem. The end of the stem is beveled for ease of insertion within an O-ring.

A plastic material, preferably a soft elastomeric material, covers the enlarged metal head and surrounds the raised collar without covering the through bore or the stem. An adhesive is placed between the surface of the metal head and the plastic material to chemically and mechanically bond the plastic material to the metal surfaces. The plastic material also extends peripherally from the sides of the enlarged metal head.

The soft elastomeric material covering the head seats against a crown, orifice or nozzle leading to a low pressure chamber or connected area.

A particular metal composition, preferably nickel plated brass, is used to form the valve member body. Axial movement of the metal stem against an O-ring seal exerts low friction during movement.

A support washer, preferably of stainless steel, is frictionally engaged or pressed onto the stem shoulder. The support washer supports a high pressure spring which biases the movable valve member against a high pressure crown or orifice.

At the same time, the support washer mechanically retains and supports the plastic material on the enlarged head to prevent spreading during seating. The support washer also prevents delamination of the plastic material from the enlarged head when exposed to high pressures.

A process for manufacture of the novel movable valve member is also provided.

The novel movable valve member exhibits improved sealing, reliability and longevity when compared with prior art valve members.

The invention will be more clearly understood by reference to the description below taken with the attached drawings.

BRIEF DESCRIPTION OF THE DRAWINGS

FIG. 2 shows a perspective view of the high pressure movable valve member of this invention.

FIG. 3 shows a sectional detailed view of the high pressure movable valve member of the invention disposed within the regulator shown in FIG. 1.

FIG. 4 shows a midline sectional view of the high pressure movable valve member of the invention.

DETAILED DESCRIPTION OF THE PREFERRED EMBODIMENTS

Figure 1:
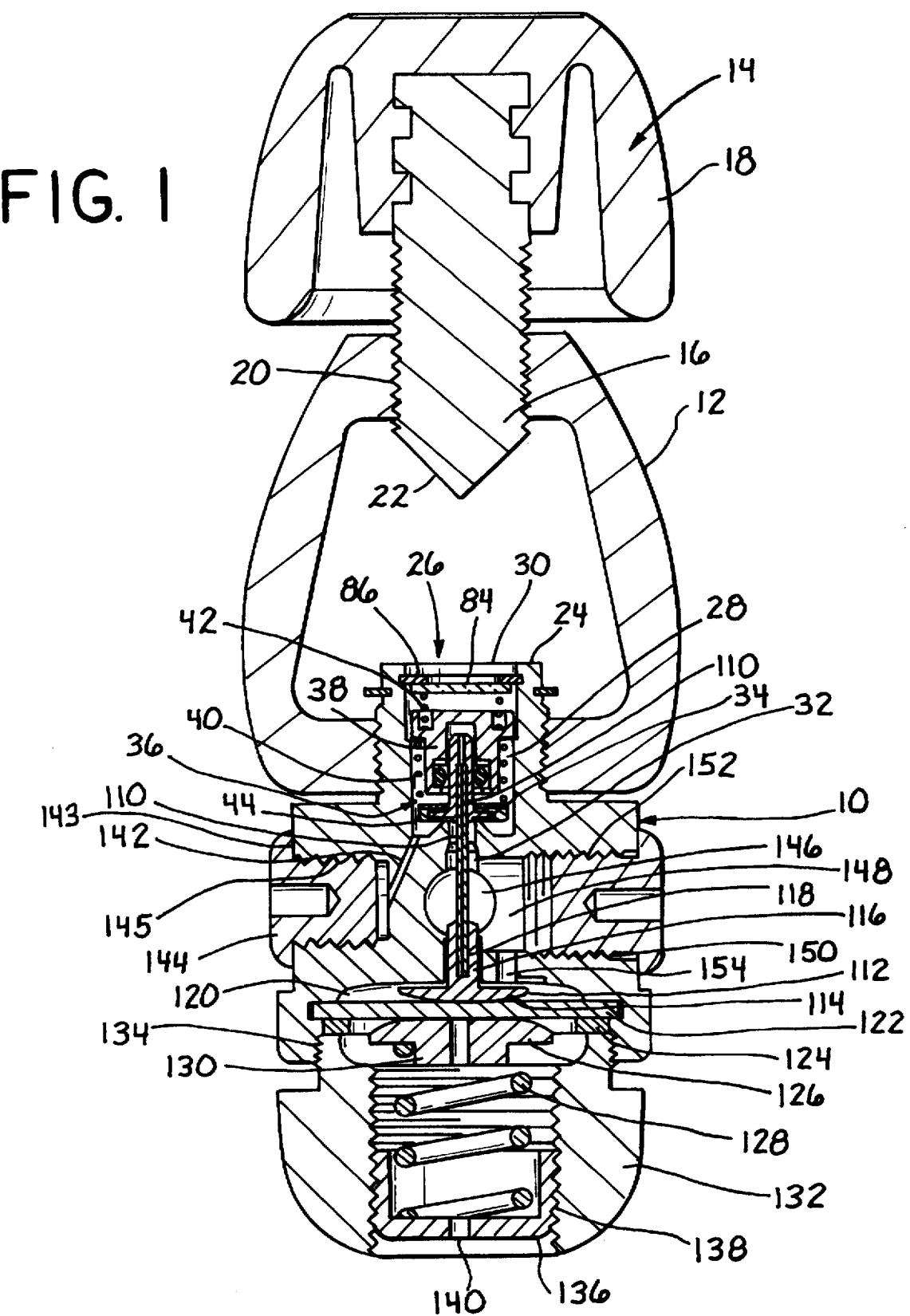
FIG. 1 shows a midline sectional view of a typical first stage regulator embodying the invention.

Referring now to the figures, and particularly to FIGS. 1 and 3, there can be seen a regulator body 10. The regulator body 10 can be made of various materials such as brass, stainless steel or other materials which are easily formed or machined and which are resistant to the gas or gases to be regulated.

A yoke 12 secures the regulator 10 to a tank or cylinder of highly pressurized gas, not shown. The yoke 12 has a yoke screw 14 connected to a rotatable threaded shaft 16. The yoke screw 14 is formed with a knob 18 secured to the rotatable shaft 16. The rotatable shaft 16 is threaded by threads 20 into the yoke 12. This allows for a pointed end 22 to be threaded against a pressurized gas tank valve outlet for driving it against the surface 24 to provide for the flow of high pressure gas in the direction 26 into the regulator 10.

The regulator body 10 includes a high pressure chamber 28 which receives flow of high pressure gas from the pressurized gas tank or cylinder at its entrance 30. The high pressure chamber 28 is operatively connected to a low or reduced pressure zone or chamber 32 at its opposite end or exit 34. The lower pressure zone or chamber 32 can be fluidly connected to a demand regulator which is not shown.

The high pressure chamber 28 which houses the first stage regulator or valve 36 has a generally cylindrical configuration. The first stage regulator 36 includes a spring block 38 and springs 40 and 42 for biasing a movable valve member 44 of the invention against the crown or orifice 46 to valve high pressure gas from the high pressure chamber 28 to the small diameter bore or low pressure chamber 32 within the main regulator body 10.

As seen in FIGS. 2 and 4, the movable valve member 44 of the invention includes an enlarged flattened circular head 48 attached to a stem or upright member or portion 50. The head 48 and the stem 50 are preferably made of nickel plated brass or other corrosion and oxidation resistant, strong metal. A central bore or axial passage 52 extends through the enlarged head 48 and through the stem 50. Interiorly, the axial bore 52 has a large diameter portion 54 which extends from the enlarged head 48 into the upright portion 50 and a small diameter portion 56 which extends below the large diameter portion 54.

Surrounding the opening to the through hole or axial bore 52 within the enlarged head 48 is a raised collar 58 which serves to anchor the elastomeric plastic material 60 in place and, at the same time, to prevent migration into the axial bore 52 during seating against the orifice or crown 46.

An adhesive 59 is disposed between and chemically bonded to the surface of the movable valve head 48 and to the molded plastic or elastomeric material 60 to resist delamination during exposure to high pressure gas.

At the juncture between the stem 50 and the head 48 is formed a shoulder 62 having a diameter slightly larger than the diameter of the stem 50. The shoulder 62 has a sloping or beveled surface 64 adjacent the stem 50. The shoulder 62 holds a support washer 66 which is pressed over the beveled surface 64 and shoulder 62. It is, thus, frictionally engaged by the shoulder 62. One side of the washer 66 supports the plastic molded material 60 while the opposite side supports the biasing spring 40.

Preferably, the support washer 66 is made of stainless steel although other strong metals can be substituted for stainless steel. For a good frictional engagement with the shoulder 62, the metal forming the support washer 66 is preferably harder than the metal forming the shoulder 62.

The base 68 of the stem 50 is beveled at its leading edge 70 to provide ease in insertion within an O-ring 72 contained in the spring block 38.

Surrounding the flattened circular head 48 is molded an elastomeric or plastic rubber-like material 60. The plastic material overlying the head 48 forms a seating surface 61 which is supported by the head 48. The molded elastomeric plastic material 60 extends peripherally to form side extensions 74 of the flattened circular head 48 to form a preferably generally square member 76 with flattened sides 78 and rounded corners 80. Other configurations can also be used such as triangular, clover leaf, dog bone, polyangular and the like.

It is important for the seating area 82 of the head 48 to be sized sufficiently so that when covered with the plastic material 60 it will fully overlie the crown or orifice 46. At the same time, the configuration should enable ease in axial movement within the cylindrical chamber 28 without binding. For this reason, smooth, rounded side surfaces are preferred.

Also, there must be sufficient space between the side extensions 74 of the plastic molded head configuration and the sides of the high pressure chamber 28 to allow free flow of high pressure air or gas to the area adjacent the orifice or crown 46.

While a cylindrical high pressure chamber 28 is shown and preferred, other high pressure chamber configurations can be used such as elliptical, or other configurations to match the configuration of the plastic molded head.

It should be kept in mind that the bearing surfaces should be smooth to avoid binding and the configuration should permit free axial movement within the high pressure chamber 28.

Plastic materials or resins can be used which provide the desirable properties of sufficient hardness for durability yet soft enough to provide a good seal and to adhere to the metal material of the underlying head 48. Elastomers, especially thermoplastic elastomers are preferred such as thermoplastic polyolefins, styrene-butadiene-styrene block copolymers, thermoplastic polyurethanes, and copolyesters. Preferably, the plastic is a polyurethane elastomer having a 90 Shore A hardness.

The adhesive 59 should be one which is compatible with the plastic or elastomeric plastic being used.

The molded plastic material 60 covering the top face, sides, and bottom surfaces of the head 48 of the movable valve member 44 seats or seals against the orifice or crown 46 opening from the high pressure chamber 28 into the low pressure chamber 32 in the regulator body 10.

The movable valve member 44 shown in the drawings has a layer of plastic material of about 0.02" overlying and underlying the head 48 which has a thickness of about 0.02". The adhesive 59 has a thickness in the range of about 0.0005" to about 0.002". The overall thickness of the plastic material 60, head 48, and adhesive 59 is about 0.063". The support washer 66 has a thickness of about 0.02" as well. It should be understood that other thicknesses can be utilized depending on the size of the orifice or crown 46 and size of the high pressure chamber 28.

At the entrance 30 to the high pressure chamber 28 from the pressurized gas cylinder is a filter 84. The filter 84 is preferably made of a sintered metal and can be held in place by means of a C clip 86. Other means can be substituted for the C clip 86 for expanding into a notch 88. The filter 84 is preferred to filter the gas as it enters the high pressure chamber 28.

Within the high pressure chamber 28, the spring block 38 underlies the filter 84. The spring block 38 is formed with a cylindrical member 90 having a cavity or opening 92. A shoulder 94 surrounding the cylindrical member 90 receives one end 96 of the spring 40 while the other end 98 of the spring 40 engages the support washer 66 on the movable valve member 44. A portion 100 of the cylindrical member 90 extending below the shoulder 94 of the spring block 38 is surrounded and contacted by one end 102 of the spring 42 while the other end 104 of the spring 42 is in contact with the filter 84.

The spring block 38 is checked from movement by the shoulder 94 of the spring block engaging a step or ledge 106 on the walls of the high pressure chamber 28.

The stem 50 of the movable valve member 44 is received within the cavity or opening 92 within the spring block 38 and sealed by an O-ring 72 and a backup ring 108. In this manner, it seals the area around the stem 50 so that flow of high pressure gas from the high pressure chamber 28 cannot flow into the space or cavity 92 within the spring block 38. At the same time, the movable valve member 44 can move upwardly and downwardly against the springs 40 and 42 in the high pressure chamber 28 so that pressure can be regulated.

Since the stem 50 must pass through the O-ring 72 during operation, to avoid binding and the possible extrusion of the O-ring 72 into the bottom of cavity or opening 92 in the spring block 38, a back-up ring 108 is utilized. Preferably the back-up ring 108 is formed of Teflon™. To provide for improved ease of movement of the stem 50 against the O-ring 72, a light lubricant can be used.

One end of a pin 110 is received within the central opening or axial bore 52 in the head 48 of the movable valve member 44. The other end of the pin 110 is received within a pin support 112. The pin support 112 has an enlarged curved surface 114 and a stem 116 having an opening 118 therein to receive the pin 110. The pin support 112 can be made of brass or other suitable material.

The enlarged surface 114 of the pin support 112 is disposed within a cavity 120 in the main body 10 while the stem 116 extends into the intermediate or lower pressure chamber 32 of the main body 10.

A diaphragm 122 exposed to ambient pressure overlies the large surface 114 of the pin support 112 within the cavity 120. A gasket 124 overlies the diaphragm 122. The diaphragm 122 can be made of an elastomeric rubber or plastic material formed, for example, with two layers of rubber over fabric. However, the diaphragm 122 can be made of any other suitable material so long as it provides diaphragmatic flexibility in association with the other portions of the regulator 10.

Overlying the diaphragm 122 is a spring pad or spring support 126 which receives a diaphragm spring 128 by seating it around an upstanding portion 130.

In order to retain the diaphragm spring 128 in seated relationship within the main body 10, a diaphragm spring retainer or cap 132 is utilized. The diaphragm spring retainer or cap 132 is threaded into the main body 10 at threads 134 which interface the main body 10 and the diaphragm spring retainer cap 132.

Adjustment is provided to the diaphragm spring 128 by means of an adjusting screw 136. The adjusting screw 136 is seated within the diaphragm spring retainer or cap 132 by means of being threaded into threads 138 therein. An exposed notch 140 can receive a screwdriver or other adjustment tool to allow it to turn within the threads 138 and provide for increased or decreased pressure on the diaphragm spring 128.

A passage or conduit 142 is formed within the main body 10 which communicates between the high pressure chamber 28 and a port or opening 143 to ambient pressure. The port 143 is blocked by a plug 144.

A high pressure gauge, not shown, can be attached to port or opening 143 by means of threads 145 to determine the pressure remaining in a tank of pressurized breathing gas. Alternately, the port 143 can be plugged or eliminated.

An enlarged passage or conduit 146 within the main body 10 forms a low pressure zone or section 32 between the diaphragm 122 and the orifice or crown 46 opening into the high pressure chamber 28.

A passage 148 from the low pressure zone 146 extends outwardly and opens into a port 150 having interior threads 152 for connection to a second stage demand regulator, not shown. A smaller side passage 154 from the passage 148 opens into the cavity 120 and provides a venturi effect to assist breathing through a demand regulator once breathing has commenced.

The regulator 10 of the invention operates when a decreased pressure is sensed within the low pressure zone 32 by a user inhaling through a second stage demand regulator. This creates demand for breathing gas, causing the first stage regulator 36 to function.

The first stage regulator 36 functions by virtue of the pressure in the low pressure zone 32 decreasing so that the diaphragm 122 then flexes inwardly. This attendantly allows the pin support 112 to move the pin 110. As the pin 110 is moved, it pushes at its interface with the interior body of the movable valve member 44 against the springs 40 and 42.

This causes the seating area 82 of the flat seating surface 61 of the movable valve member 44 to separate from the orifice 46. This permits the flow of gas over the orifice or crown 46 into the low pressure area or zone 32. Gas flow continues until the pressure increases within the low pressure zone 32 sufficiently to push against the diaphragm 122 reducing the force against seating area 82 of the seating surface 61 until the movable valve member 44 is reseated against the orifice 46.

A process for the manufacture of the novel movable valve member 44 includes providing a metal valve member having an enlarged head connected to a stem and having a shoulder on the stem adjacent the head. An axial bore is then drilled through the enlarged head and stem. Next, the top face or surface of the head is cleaned as by sandblasting.

An adhesive, preferably a heat activated adhesive, is then applied to the top face or surface of the head in any convenient manner, for example by spraying. The cleaned metal valve member with the adhesive is then placed into a mold. The axial bore can conveniently be used to accurately place the movable valve member within the mold and to prevent plastic material from entering the openings to the axial bore during molding.

Plastic or elastomeric material is then molded around the enlarged head. If a heat activated adhesive has been used, the heat of the mold at the same time activates the adhesive to form a strong bond between the metal surface and the molded plastic material.

According to a preferred embodiment, the adhesive is colored and the molded plastic material has a clarity or translucence sufficient to permit the color of the adhesive to be seen through the molded plastic material. After removal from the mold, a washer, preferably of stainless steel, is pressed over the metal shoulder on the metal stem where it is frictionally retained. Thereafter, the movable valve member can be placed in the regulator as described above The invention thus described provides a novel movable valve member for use with a first stage regulator as described above, or with any other gas pressure regulating device.

Various modifications of the invention are contemplated which will be obvious to those skilled in the art and can be resorted to without departing from the spirit and scope of the invention as defined by the following claims.

We claim:

1. A regulator for a self-contained breathing apparatus comprising:
    a regulator body;
    a high pressure chamber within said regulator body for receipt of high pressure gas;
    means for connecting said high pressure chamber to a source of high pressure gas;
    a low pressure chamber in communication with said high pressure chamber;
    an orifice separating said high pressure chamber from said low pressure chamber;
    a movable valve member within said high pressure chamber for sealing contact with said orifice;
    a first spring biasing means within said high pressure chamber which is adapted for biasing said movable valve member sealingly against said orifice;
    a cavity overlying said low pressure chamber;
    a diaphragm disposed within said cavity;
    linkage means between said diaphragm and said movable valve member for moving said movable valve member against the bias of said first spring biasing means in response to movement of said diaphragm;
    a second spring biasing means within said cavity adapted for biasing said diaphragm toward said high pressure chamber and against said movable valve member;
    said movable valve member comprising an enlarged head connected to an upright portion;
    an axial bore extending through said head and upright portion;
    said enlarged head having a top surface, side surfaces and a bottom surface, said top surface being sized for overlying said orifice;
    a plastic material overlying and adhered to said top surface, side surfaces and bottom surface of said enlarged head of said valve body, said plastic material on said top surface being adapted for sealing against said orifice;
    said upright portion and said axial bore being free of plastic; and,
    a support washer overlying said upright portion for contact with and support of said plastic material overlying said bottom surface of said enlarged head and for support of said first spring biasing means.

2. A regulator for a self-contained breathing apparatus according to claim 1 wherein said first spring biasing means comprises:
    a spring block having a cavity therein;
    at least one spring between said spring block and said movable valve member for biasing said movable valve member against said orifice;
    said upright portion of said movable valve member extending into the cavity of said spring block; and,
    sealing means for surrounding said upright portion and sealing it within said cavity.

3. A regulator for a self-contained breathing apparatus according to claim 2 wherein:
    said linkage means comprises:
        an upright portion formed as a pin extending from said movable valve member into said low pressure chamber and having an enlarged surface member for contact with said diaphragm.

4. A regulator for a self-contained breathing apparatus according to claim 3 further comprising:
    at least one opening in communication with said low pressure chamber for attachment of a second stage demand regulator.

5. A regulator for a self-contained breathing apparatus according to claim 4 further comprising:

a conduit within said regulator body which extends from said high pressure chamber to ambient for attachment of a high pressure gauge.

6. A regulator for a self-contained breathing apparatus according to claim 3 wherein:

said movable valve member is formed of a metal;

said axial bore which extends through said enlarged head and said upright portion is adapted for receipt of said pin of said linkage means member; and, a raised collar surrounding said bore on said enlarged head.

7. A regulator for a self-contained breathing apparatus according to claim 6 wherein:

said axial bore of said movable valve member has a large diameter portion which extends from said enlarged head into said upright portion.

8. A regulator for a self-contained breathing apparatus according to claim 6 wherein:

said metal of said upright portion is nickel plated;

said plastic material is molded around said enlarged head of said movable valve member to form a peripheral extension and a flattened seating surface for sealing contact with said orifice.

9. A regulator for a self-contained breathing apparatus according to claim 1 further comprising:

a demand regulator connected to said regulator body for receipt of regulated pressure gas from said first stage regulator.

10. The combination according to claim 1 wherein:

a shoulder is formed on said upright portion of said movable valve member adjacent said enlarged head for retaining said support washer; and, an adhesive is disposed between said enlarged head and said plastic material.

11. A regulator for a self-contained breathing apparatus according to claim 9 wherein:

said shoulder is beveled.

12. A movable valve member for a high pressure breathing gas regulator comprising:

a metal member formed with an enlarged head and a stem and having an axial bore extending through said enlarged head and stem;

said enlarged head sized to overlie an orifice;

a plastic material enclosing and adhered to said enlarged head to form a seating surface for an orifice; and, said stem and said axial bore being free of plastic.

13. The combination of the movable valve member of claim 12 and a support washer overlying said stem for support of said plastic material and to form a strong contact surface for engagement of a spring biasing means.

14. The combination according to claim 13 wherein:

said support washer is formed of a metal which is harder than the metal of said movable valve member.

15. A movable valve member according to claim 13 wherein:

an adhesive is disposed between said enlarged head and said plastic material;

said stem includes a shoulder formed adjacent said enlarged head for engaging said support washer; and, a bevel formed at the end of said stem.

16. The movable valve member according to claim 12 wherein:

said enlarged head of said metal member is a rounded flattened member; and, said plastic material forms side extensions to form a generally square member with rounded corners and having a flat seating surface.

* * * * *